US008727944B2

(12) United States Patent
Noboru et al.

(10) Patent No.: US 8,727,944 B2
(45) Date of Patent: May 20, 2014

(54) MOTOR GENERATOR SYSTEM DRIVEN BY V-BELT

(71) Applicants: Hyundai Motor Company, Seoul (KR); Kia Motors Corporation, Seoul (KR); Hyundai Motor Japan R&D Center, Inc., Yokohama (JP)

(72) Inventors: Nakano Noboru, Chiba (JP); Sakurai Nobuo, Chiba (JP)

(73) Assignees: Hyundai Motor Company, Seoul (KR); Kia Motors Corporation, Seoul (KR); Hyundai Motor Japan R&D Center, Inc., Yokohama (JP)

(*) Notice: Subject to any disclaimer, the term of this patent is extended or adjusted under 35 U.S.C. 154(b) by 0 days.

(21) Appl. No.: 13/630,262

(22) Filed: Sep. 28, 2012

(65) Prior Publication Data

US 2013/0035204 A1 Feb. 7, 2013

Related U.S. Application Data

(62) Division of application No. 12/503,163, filed on Jul. 15, 2009, now Pat. No. 8,292,768.

(30) Foreign Application Priority Data

Dec. 8, 2008 (JP) ................................. 2008-312101

(51) Int. Cl.
*B60W 10/04* (2006.01)
*F16H 37/00* (2006.01)
*B60K 17/28* (2006.01)

(52) U.S. Cl.
USPC .............................. 477/115; 476/30; 180/53.8

(58) Field of Classification Search
USPC ............. 475/5, 149, 150, 151, 153, 210, 296, 475/35, 214, 215, 216, 217; 180/53.8; 477/5, 115; 74/15.63; 192/3.25; 476/16, 17, 28, 29, 30, 33
See application file for complete search history.

(56) References Cited

U.S. PATENT DOCUMENTS

| 4,382,188 | A | * | 5/1983 | Cronin | 290/1 C |
|---|---|---|---|---|---|
| 4,407,398 | A | * | 10/1983 | Fiala | 477/5 |
| 4,708,030 | A | | 11/1987 | Cordner | |
| 4,846,768 | A | | 7/1989 | Kitami et al. | |
| 6,048,288 | A | | 4/2000 | Tsujii et al. | |
| 6,299,563 | B1 | * | 10/2001 | Shimasaki | 477/5 |
| 6,524,217 | B1 | | 2/2003 | Murakami et al. | |
| 6,527,662 | B2 | * | 3/2003 | Miyata et al. | 475/216 |
| 6,554,736 | B2 | | 4/2003 | Takano et al. | |
| 6,852,063 | B2 | | 2/2005 | Takahashi et al. | |

(Continued)

FOREIGN PATENT DOCUMENTS

| JP | 2001-171367 A | 6/2001 |
|---|---|---|
| KR | 10-0229415 B1 | 11/1999 |
| KR | 10-2005-0031374 A | 4/2005 |

*Primary Examiner* — Roger Pang
(74) *Attorney, Agent, or Firm* — Edwards Wildman Palmer LLP; Peter F. Corless

(57) ABSTRACT

A motor-generator system for a vehicle, in which power transmission between a crankshaft of an engine and a motor-generator is performed by a V-belt wound around pulleys thereof, includes a speed controller controlling the rotational speed of the V-belt within a predetermined range and provided on a crankshaft pulley mounted on the crankshaft. The motor-generator system, among others, can maintain the power transmission force of the V-belt at a high level.

4 Claims, 7 Drawing Sheets

(56) References Cited

U.S. PATENT DOCUMENTS

| | | |
|---|---|---|
| 6,878,094 B2 | 4/2005 | Kitamura et al. |
| 6,910,453 B2 | 6/2005 | Sugino et al. |
| 7,246,672 B2 | 7/2007 | Shirai et al. |
| 7,344,472 B2 * | 3/2008 | Hickam ............... 477/5 |
| 7,614,973 B2 | 11/2009 | Parthuisot et al. |
| 8,052,562 B2 | 11/2011 | Greb et al. |
| 2003/0057705 A1 * | 3/2003 | Kusumi et al. ............ 290/40 C |
| 2004/0038769 A1 | 2/2004 | Eibler |
| 2004/0164560 A1 | 8/2004 | Odahara et al. |
| 2006/0154775 A1 * | 7/2006 | Ali et al. ............... 475/189 |
| 2011/0086739 A1 * | 4/2011 | Kajigai et al. ............ 477/5 |

* cited by examiner

MOTOR GENERATOR SYSTEM DRIVEN BY V-BELT

CROSS-REFERENCE TO RELATED APPLICATION

This application is a divisional application of U.S. application Ser. No. 12/503,163, filed Jul. 15, 2009, which claims under 35 U.S.C. §119(a) of Japanese Patent Application No. 2008-312101, filed Dec. 8, 2008, the entire contents of which are incorporated herein by reference.

BACKGROUND (a) Technical Field

The present disclosure relates to a motor-generator system driven by a V-belt. More particularly, it relates to a motor-generator system driven by a V-belt, which improves power transmission efficiency using a speed controller controlling the rotational speed of the V-belt.

(b) Background Art

An example of a typical V-belt is shown in FIG. 5. A V-belt 6 is connected to a crankshaft pulley 1 of an engine 5, a motor-generator pulley 2, a water pump pulley 3, and a compressor pulley 4. When a crankshaft of the engine 5 rotates, the power of the engine 5 is transmitted to the water pump pulley 3 or the compressor pulley 4 as auxiliary equipment by the V-belt 6. A motor-generator comprises an electric motor and an electric generator. The electric motor rotates the motor-generator pulley 2 to start the engine 5. During traveling of a vehicle, the power of the engine 5 is transmitted to the electric generator via the motor-generator pulley 2, and the generated electricity is stored in a battery (not shown).

A typical relationship between V-belt speed and transmission force is shown in FIG. 6. As shown in FIG. 6, the transmission force of the V-belt depends on the speed of the V-belt, i.e., the rotational speed of the pulley. When the speed of the V-belt is low, i.e., when the rotational speed of the pulley is low, the transmission force of the V-belt decreases, and thus it is impossible to provide efficient power transmission.

A typical relationship between motor rotational speed, torque, and efficiency is shown in FIG. 7. As shown in FIG. 7, the efficiency of the motor is very poor at low speed and high torque. In FIG. 7, if the motor torque is 400 to 500 Nm at a rotational speed of about 250 rpm, for example, the efficiency of the motor is below 50%. In general, this motor torque is inevitably used during start-up of the engine, and thus the load of the battery is increased. Since this low rotational speed corresponds to a V-belt speed of 2 to 5 m/s, the transmission force of the V-belt is as low as 3 kW as shown in FIG. 6.

Japanese Patent Publication No. 2003-42248 discloses a belt tension adjusting device, which applies a large tension to a V-belt to transmit a large transmission torque from a starter motor to a crankshaft of an engine during start-up of the engine and releases the tension after the start-up is complete. However, although the increase in the tension of the V-belt prevents slip between the V-belt and the pulley, it does not improve the power transmission efficiency.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

Accordingly, the present invention provides a motor-generator system driven by a V-belt, which can maintain the power transmission force of the V-belt at a high level In one aspect, the present invention provides a motor-generator system driven by a V-belt and provided in a vehicle in which power transmission between a crankshaft of an engine and a motor-generator is performed by a V-belt wound around pulleys thereof, the motor-generator system including a speed controller controlling the rotational speed of the V-belt within a predetermined range and provided on a crankshaft pulley mounted on the crankshaft.

In a preferred embodiment, the speed controller includes a planetary gear unit disposed between the crankshaft pulley and the crankshaft, a first clutch directly connecting the crankshaft pulley to the crankshaft, and a second clutch connecting the crankshaft pulley to the planetary gear unit.

In another preferred embodiment, the speed controller includes a toroidal converter and a governor controlling the inclination angle of a power roller of the toroidal converter according to the rotational speed of the crankshaft.

In still another preferred embodiment, the governor includes a solenoid formed by winding a coil around a movable core, in which an electric current according to the rotational speed of the crankshaft flows through the coil, and the inclination angle of the power roller is controlled by the movable core.

In yet another preferred embodiment, he speed controller further includes a clutch disposed between the toroidal converter and the crankshaft.

In still yet another preferred embodiment, the speed controller includes a torque converter.

In a further preferred embodiment, the torque converter includes a lock-up clutch rotating the crankshaft and the crankshaft pulley at the same speed.

In another further preferred embodiment, the speed controller further includes a clutch disposed between the torque converter and the crankshaft.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
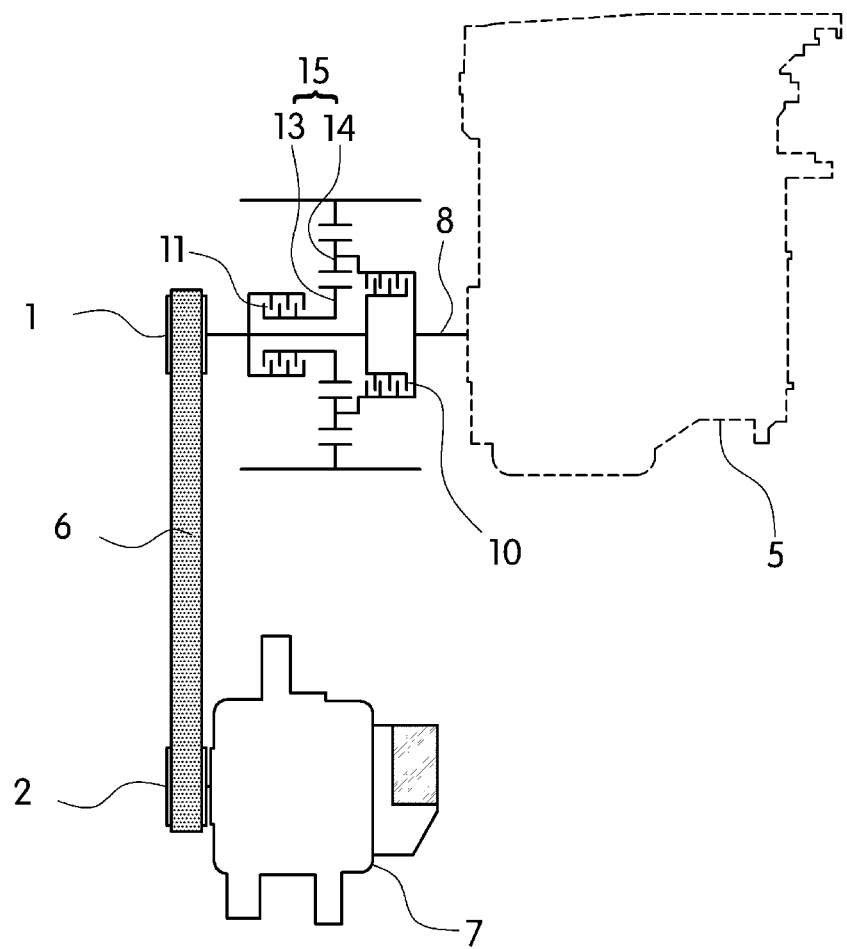
FIG. 1 is a schematic diagram of a motor-generator system driven by a V-belt in accordance with a first embodiment of the present invention, in which a planetary gear unit and a clutch are used in a speed controller.

Reference numerals set forth in the Drawings includes reference to the following elements as further discussed below:

| | |
|---|---|
| 1: crankshaft pulley | 2: motor-generator pulley |
| 3: water pump pulley | 4: compressor pulley |
| 5: engine | 6: V-belt |
| 7: motor-generator | 8: crankshaft |
| 9: lock-up clutch | 10: first clutch |
| 11: second clutch | 13: sun gear |
| 14: planetary gear | 15: planetary gear unit |
| 16: governor | 17: toroidal converter |
| 18: power roller | 19a: input disc |
| 19b: output disc | 20: clutch |
| 21: torque converter | 21a: pump impeller |
| 21b: stator | 21c: turbine runner |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, embodiments of a motor-generator system driven by a V-belt in accordance with the present invention will be described in detail with reference to the accompanying drawings.

FIG. 1 is a schematic diagram of a motor-generator system driven by a V-belt in accordance with a first embodiment of the present invention, in which a planetary gear unit and a clutch are used in a speed controller.

A motor-generator 7 and an engine 5 perform power transmission by a V-belt 6 wound around a motor-generator pulley 2 and a crankshaft pulley 1. A planetary gear unit 15 including a sun gear 13 and planetary gears 14, a first clutch 10, and a second clutch 11 are provided in the crankshaft pulley 1. The first clutch 10 directly connects the crankshaft pulley 1 to a crankshaft 8 of the engine 5. Meanwhile, the crankshaft 8 is connected to a carrier (not shown) that connects the planetary gears 14. The second clutch 11 connects the crankshaft pulley 1 to the sun gear 13. For example, three planetary gears 14 rotating on its own axis and revolving around the sun gear 13 are connected to the carrier (connecting member) such that, when the sun gear 13 rotates three times, the carrier rotates one time. In this case, if the sun gear 13 is an input and the carrier connecting the planetary gears 14 is an output, the planetary gear unit 15 is a ⅓ speed reducer.

According to the speed controller of FIG. 1, the following control operations can be performed. (1) During start-up of the engine 5, or when the engine 5 rotates at a low speed, the first clutch 10 is disengaged and the second clutch 11 is engaged such that the rotational speed of the crankshaft pulley 1 is reduced and the power is transmitted to the crankshaft 8. That is, the crankshaft 8 can rotate at a rotational speed suitable for the low-speed rotation by maintaining the speed of the V-belt 6 at a high level. (2) When the engine rotates at a high speed, the first clutch 10 is engaged and the second clutch 11 is disengaged such that a shaft of the crankshaft pulley 1 is directly connected to the crankshaft 8, thus maintaining the high-speed rotation of the V-belt 6. (3) When the engine is stopped to eliminate unnecessary idling, for example, the first clutch 10 and the second clutch 11 are disengaged such that the crankshaft pulley 1 is disconnected from the planetary gear unit 15 and the crankshaft 8. Therefore, it is possible to operate auxiliary equipments such as an air conditioner by the power of the motor-generator 7 even when the engine is stopped.

Figure 2:
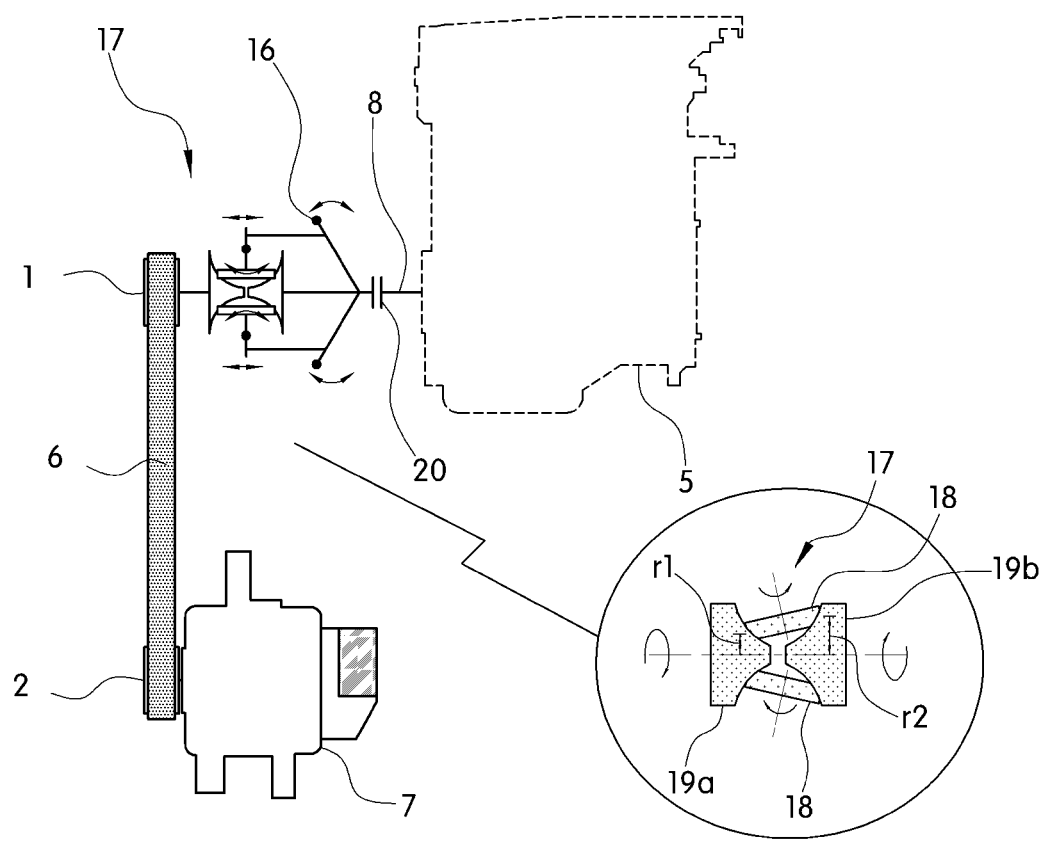
FIG. 2 is a schematic diagram of a motor-generator system driven by a V-belt in accordance with a second embodiment of the present invention, in which a toroidal converter and a clutch are used in a speed controller.

FIG. 2 is a schematic diagram of a motor-generator system driven by a V-belt in accordance with a second embodiment of the present invention, in which a toroidal converter and a clutch are used in a speed controller.

As shown in FIG. 2, the motor-generator 7 and the engine 5 perform power transmission by the V-belt 6 wound around the motor-generator pulley 2 and the crankshaft pulley 1. A toroidal converter 17, a governor 16, and a clutch 20 are provided in the crankshaft pulley 1. The clutch 20 connects the crankshaft 8 to the governor 16.

The toroidal converter 17 includes a conical input disc 19a having a circular arc shaped side, an output disc 19b having the same shape as the input disc 19a, and a power roller 18 connecting the input disc 19a to the output disc 19b as shown in an enlarged circle of FIG. 2. The input disc 19a rotates and is in contact with the power roller 18 at a position of radius r1. Then, the power roller 18 rotates and the other end of the power roller 18 is in contact with the output disc 19b at a position of radius r2. Thus, the output disc 19b is rotated by the rotation of the power roller 18. In this case, the transmission gear ratio γ is expressed as γ=r1/r2. For example, the power roller 18 is inclined so that r1 is less than r2 (r1<r2), it is possible to use the toroidal converter 17 as a speed reducer. Moreover, the input disc 19a and the output disc 19b are not limited to their input and output functions and may be used bidirectionally.

The governor 16 is a device for inclining the power roller 18. The governor 16 of FIG. 2 is configured by attaching an arm and a weight to the crankshaft 8. By the arm and the weight, the governor 16 is moved outward by the centrifugal force according to the rotational speed of the crankshaft 8, thus inclining the power roller 18. Alternatively, instead of the arm and the weight, the governor 16 may comprise a solenoid (not shown) in which a current flows according to the rotational speed. The solenoid in which a movable ferromagnetic core is actuated by a magnetic field generated by a current flowing through a coil is compact and has a large driving force.

According to the speed controller of FIG. 2, the following control operations can be performed. (1) During start-up of the engine 5, the clutch 20 is engaged such that the speed of the crankshaft pulley 1 is maintained constant by the governor 16 and the toroidal converter 17. (2) When the engine 5 is stopped, the clutch 20 is disengaged such that the crankshaft pulley 1 is disconnected from the crankshaft 8. Therefore, it is possible to operate auxiliary equipments by the power of the motor-generator 7 even when the engine 5 is stopped.

Figure 3:
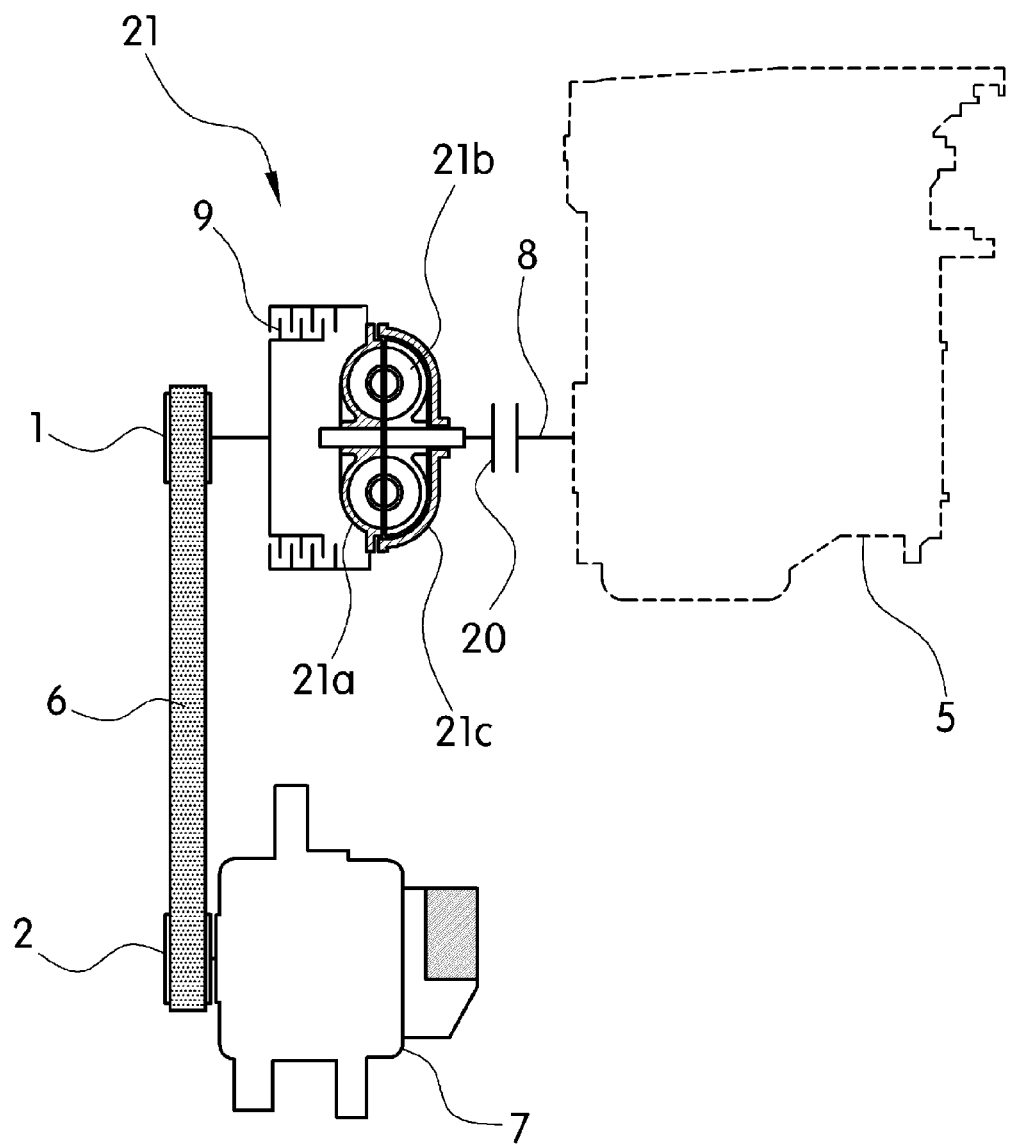
FIG. 3 is a schematic diagram of a motor-generator system driven by a V-belt in accordance with a third embodiment of the present invention, in which a torque converter and a clutch are used in a speed controller.

FIG. 3 is a schematic diagram of a motor-generator system driven by a V-belt in accordance with a third embodiment of the present invention, in which a torque converter and a clutch are used in a speed controller.

As shown in FIG. 3, the motor-generator 7 and the engine 5 perform power transmission by the V-belt 6 wound around the motor-generator pulley 2 and the crankshaft pulley 1. The crankshaft pulley 1 may include a torque converter 21 and a clutch 20.

The torque converter 21 includes a pump impeller 21a, a stator 21b, which directs the oil flow generated by the pump impeller 21a, and a turbine runner 21c rotated by the oil from the stator 21b. Here, the pump impeller 21a is connected to the crankshaft pulley 1, and the turbine runner 21c is connected to the crankshaft 8. The oil discharged from the turbine runner 21c is returned to the pump impeller 21a via the stator 21b to rotate the pump impeller 21a. Moreover, a lock-up clutch 9 is provided to directly connect the pump impeller 21a to the turbine runner 21c as shown in FIG. 3.

Figure 4:
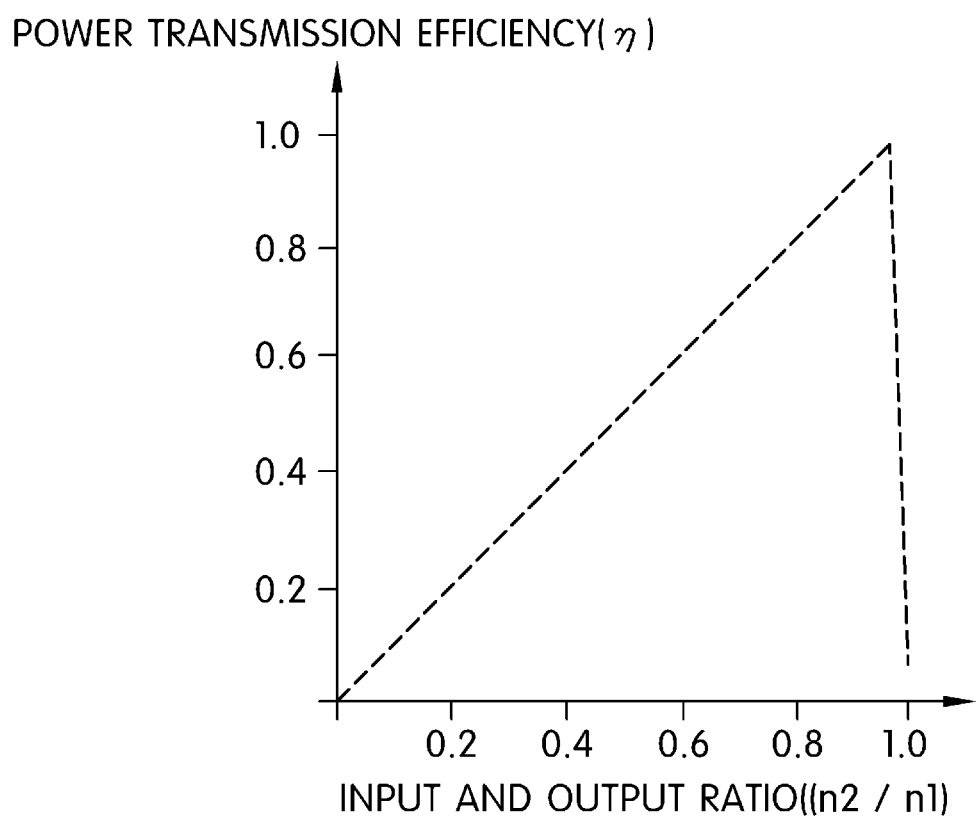
FIG. 4 is a diagram showing power transmission efficiency of the torque converter of FIG. 3, in which the vertical axis represents the power transmission efficiency (η) and the horizontal axis represents the ratio between input and output power [n2 (turbine runner speed)/n1 (pump impeller speed)]
Figure 5:
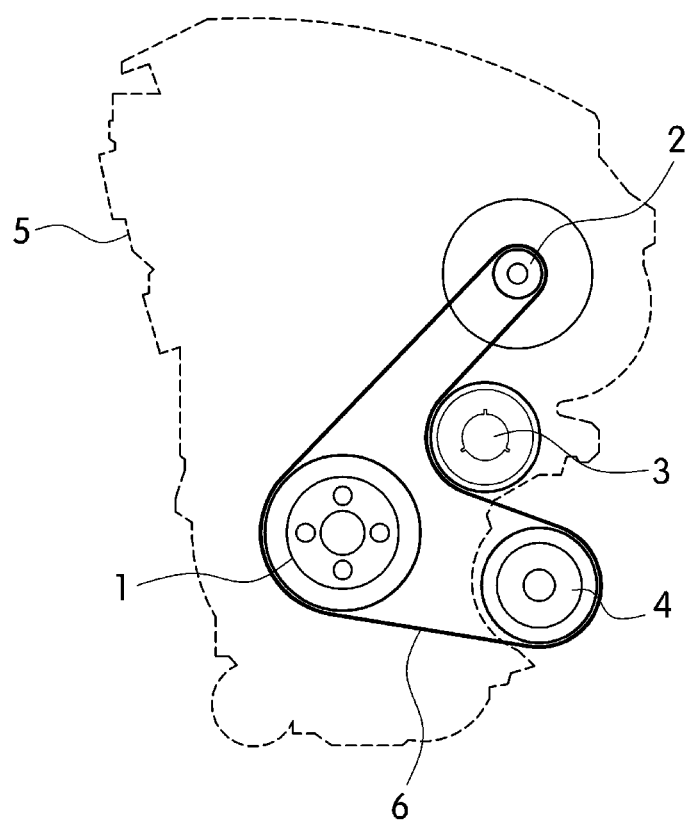
FIG. 5 is a schematic diagram showing a typical V-belt.
Figure 6:
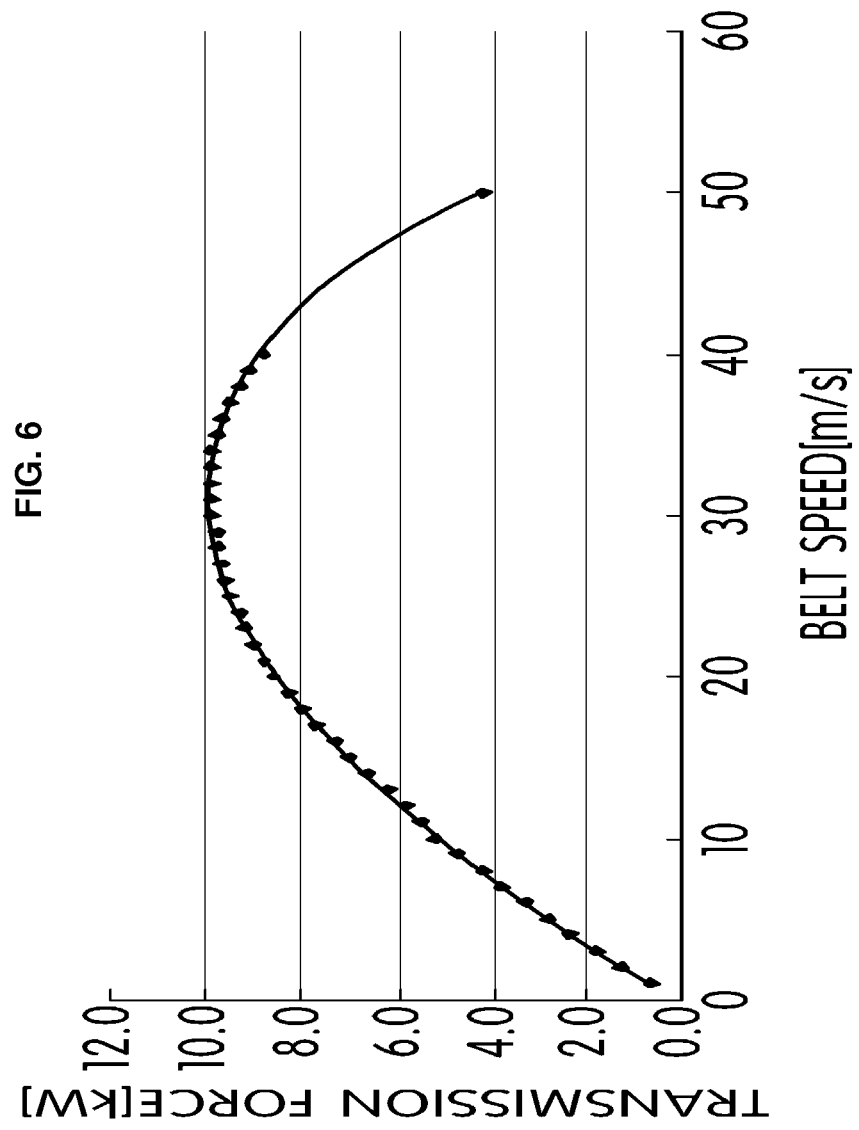
FIG. 6 is a graph showing the typical relationship between V-belt speed and transmission force.
Figure 7:
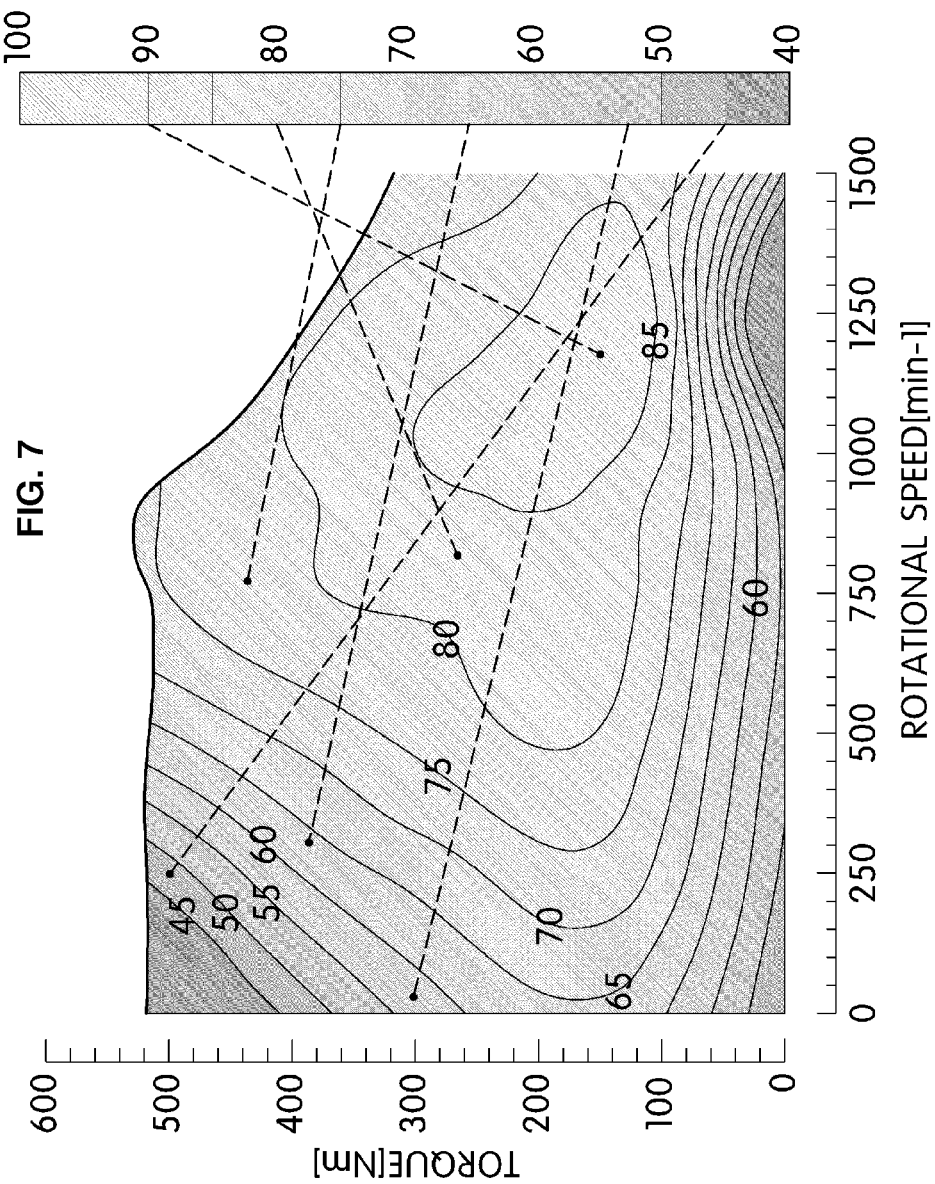
FIG. 7 is a graph showing the typical relationship between motor rotational speed, torque, and efficiency.

According to the speed controller of FIG. 3, the following control operations can be performed. (1) When there a large speed difference between the pulleys during start-up of the engine 5, the clutch 20 is engaged so as to control the speed according to the transmission force by the torque converter 21. (2) When the speed difference between the pulleys becomes smaller after the start-up of the engine 5, the clutch 20 is engaged and, further, the lock-up clutch 9 is engaged. Without intending to limit any theory, the reason is that, when speed n1 of the pump impeller 21a becomes equal to speed n2 of the turbine runner 21c, the power transmission efficiency η is significantly deteriorated as shown in FIG. 4. Accordingly, the lock-up clutch 9 is engaged to prevent the deterioration of the efficiency. (3) When the engine 5 is stopped, the clutch 20 is disengaged such that the crankshaft pulley 1 is disconnected from the crankshaft 8. Therefore, it is possible to operate auxiliary equipments by the power of the motor-generator 7 even when the engine 5 is stopped.

As described above, according to the motor-generator systems driven by the V-belt of the present invention, in which the speed controller controlling the rotational speed of the V-belt within a predetermined range is provided in the crankshaft pulley, it is possible to maintain the rotational speed of the V-belt at a high level, even if the rotational speed of the engine varies, thus maintaining high transmission force. For example, during start-up of the engine, the motor-generator is rotated at a high speed and the high transmission force of the V-belt is maintained such that the crankshaft can transmit high torque even at a low rotational speed. Therefore, it is possible to improve the capability for supporting the motor-generator and improve the charging efficiency of a hybrid vehicle.

With the use of the speed controller including the planetary gear unit, the first clutch directly connecting the crankshaft pulley to the crankshaft, and the second clutch connecting the crankshaft pulley to the planetary gear unit, it is possible to maintain the high rotational speed of the V-belt. Moreover, the crankshaft pulley can be disconnected from the crankshaft, and thus it is possible to operate auxiliary equipments by the power of the motor-generator even during idle stop in which the engine is stopped due to temporary parking, for example.

With the use of the speed controller including the toroidal converter and the governor, the rotational speed of the V-belt can be maintained constant by the transmission function of the toroidal converter.

Moreover, with the use of the solenoid provided in the toroidal converter, in which the movable core is actuated by the current according to the rotational speed of the crankshaft flowing through the coil, it is possible to achieve a compact size and a large driving force compared to the case where the power roller of the toroidal converter is actuated by rotating the mechanical weight and using the centrifugal force.

Furthermore, with the use of the clutch disposed between the toroidal converter and the crankshaft, it is possible to operate auxiliary equipments by the power of the motor-generator even during idle stop in which the engine is stopped due to temporary parking, for example.

In addition, with the use of the speed controller comprising the torque converter, it is possible to maintain the rotational speed of the V-belt constant by the transmission function of the toroidal converter. That is, the torque converter includes the pump impeller, the stator, and the turbine runner such that the turbine runner can be rotated by amplifying the torque ratio by, e.g., two times by the oil flow of the stator.

Additionally, with the use of the lock-up clutch rotating the crankshaft and the crankshaft pulley at the same speed and provided in the torque converter, the power is directly transmitted, and thus it is possible to prevent the energy conversion loss by the oil.

Besides, with the use of the clutch disposed between the torque converter and the crankshaft, it is possible to operate auxiliary equipments by the power of the motor-generator even during idle stop in which the engine is stopped due to temporary parking, for example.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A motor-generator system for a vehicle in which power transmission between a crankshaft of an engine and a motor-generator is performed by a V-belt wound around pulleys thereof, the motor-generator system comprising a toroidal converter and governor combination including at least one of an arm and weights and a solenoid form by winding a coil around a motor core, the toroidal converter and governor combination controlling the rotational speed of the V-belt within a predetermined range and provided on a crankshaft pulley, the toroidal converter and governor combination connecting the pulley to the crankshaft via a clutch between the engine and one or more components of the toroidal converter and governor combination.

2. The motor-generator system of claim 1, wherein the governor controls the inclination angle of a power roller of the toroidal converter according to the rotational speed of the crankshaft.

3. The motor-generator system of claim 2, wherein an electric current is applied by the governor according to the rotational speed of the crankshaft flows through the coil, and the inclination angle of the power roller is controlled by the movable core.

4. A motor-generator system for a vehicle in which power transmission between a crankshaft of an engine and a motor-generator is performed by a V-belt wound around pulleys thereof, the motor-generator system comprising a torque converter controlling the rotational speed of the V-belt within a predetermined range and provided on a crankshaft pulley, the torque converter connecting the pulley to the crankshaft via a clutch between the engine and one or more components of the torque converter, wherein the torque converter comprises a lock-up clutch rotating the crankshaft and the crankshaft pulley at the same speed.

* * * * *